United States Patent
Sharifi

(10) Patent No.: US 10,318,543 B1
(45) Date of Patent: Jun. 11, 2019

(54) OBTAINING AND ENHANCING METADATA FOR CONTENT ITEMS

(71) Applicant: Google LLC, Mountain View, CA (US)

(72) Inventor: Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 701 days.

(21) Appl. No.: 14/660,580

(22) Filed: Mar. 17, 2015

Related U.S. Application Data

(60) Provisional application No. 61/968,208, filed on Mar. 20, 2014.

(51) Int. Cl.
   G06F 16/25 (2019.01)
   G06F 17/22 (2006.01)
   G06F 16/22 (2019.01)

(52) U.S. Cl.
   CPC ........ G06F 16/254 (2019.01); G06F 16/2228 (2019.01); G06F 17/2235 (2013.01)

(58) Field of Classification Search
   CPC .... G06F 16/164; G06F 16/2291; G06F 16/23; G06F 16/245; G06F 16/254
   USPC ................................................ 707/602, 726
   See application file for complete search history.

(56) References Cited

U.S. PATENT DOCUMENTS

| | | | |
|---|---|---|---|
| 7,958,136 B1 | 6/2011 | Curtis et al. | |
| 9,026,540 B1 * | 5/2015 | Postelnicu | G06F 17/30038 707/748 |
| 2009/0052784 A1 | 2/2009 | Covell et al. | |
| 2009/0132924 A1 * | 5/2009 | Vasa | G11B 27/105 715/723 |
| 2010/0034470 A1 | 2/2010 | Valencia-Campo et al. | |
| 2010/0290699 A1 | 11/2010 | Adam et al. | |
| 2010/0293187 A1 * | 11/2010 | Biehn | H04H 60/73 707/769 |
| 2011/0019925 A1 | 1/2011 | Luk | |
| 2011/0106782 A1 | 5/2011 | Ke et al. | |
| 2012/0251082 A1 * | 10/2012 | De Vos | H04N 5/765 386/285 |

(Continued)

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

(Continued)

*Primary Examiner* — Hanh B Thai
(74) *Attorney, Agent, or Firm* — Byrne Poh LLP

(57) ABSTRACT

Systems, methods and computer-readable media for obtaining and enhancing metadata for content items are provided. In an aspect, a system can include an identification component configured to identify a resource, accessible to the system via a network, that includes a reference to a content item, and an extraction component configured to extract metadata associated with the resource and the reference to the content item. The system can further include an index component configured to associate at least a portion of the metadata with the content item in a data store, and a matching component configured to identify one or more reference content items based on correspondence between the metadata and reference metadata respectively associated with the one or more reference content items.

20 Claims, 10 Drawing Sheets

(56) References Cited

U.S. PATENT DOCUMENTS

2012/0311081 A1* 12/2012 Robbin ............. G06F 17/30174
709/217
2013/0231931 A1* 9/2013 Kulis ...................... G06F 3/167
704/235

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE-Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

Dewi, Lydia Mutiara, "Incorporating Global Information in a Folk Song Classification System," Department of Communication and Information Sciences, Jul. 2011.

Office Action for U.S. Appl. No. 13/363,004, dated Sep. 6, 2013, 26 pages.

Office Action for U.S. Appl. No. 13/363,004, dated Mar. 4, 2014, 19 pages.

Office Action for U.S. Appl. No. 13/363,004, dated Sep. 11, 2014, 21 pages.

Notice of Allowance for U.S. Appl. No. 13/363,004, dated Dec. 31, 2014, 21 pages.

Baluja et al., "Content Fingerprinting Using Wavelets", in the Proceedings of the 3rd European Conference on Visual Media Production, London, UK, Nov. 29-30, 2016, pp. 198-207.

* cited by examiner

OBTAINING AND ENHANCING METADATA FOR CONTENT ITEMS

PRIORITY CLAIM

This application claims priority to U.S. Provisional Patent Application No. 61/968,208 filed on Mar. 20, 2014, and entitled "USING DESCRIPTIVE DATA OF RESOURCES AS A SIGNAL FOR CONTENT IDENTIFICATION." The entirety of the aforementioned application is incorporated by reference herein.

TECHNICAL FIELD

This disclosure generally relates to systems, methods and computer-readable media for obtaining and enhancing metadata for content items.

BACKGROUND

Networked entities for sharing content via the Internet, such as web sites or application service providers (ASPs) and their client application counterparts, have become commonplace. These entities may be accessed to upload content, and to find other content for downloading or viewing as authorized. Such entities often employ "structured" metadata associated with the content items provided thereby to facilitate efficient storing, searching, and retrieval of the content items. Structured metadata refers to metadata that describes a data object, such as content item, according to fixed, predefined patterns and term descriptors.

However, when users upload or provide content to such an entity for sharing with other users or for various other purposes, the entity generally has little or no control over the metadata that is included with the content file. Often, the content items received by such entities (e.g., an uploaded video or music file) have little or no metadata associated therewith or the metadata associated therewith is low quality. Further, even when users do include some metadata with uploaded content items, the metadata is often "unstructured." Contrary to structured metadata, unstructured metadata describes metadata that is composed of free-form descriptive terms that do not follow a particular linguistic pattern. For instance, there may be no particular restrictions placed on the descriptive terms a user can use to identify or describe a content item and so the descriptive terms can be as varied as the users who think them up. For example, one user might describe an uploaded music or video file in terms of a full title and artist name, while another user might describe an uploaded file in terms of a partial title and an artist nickname or venue where a live performance took place, and so on.

Accordingly, content providers cannot rely on users to provide sufficient and structured metadata with uploaded content items. For content providers that receive vast amounts of content items over time (e.g., such as a media sharing system that receives over 300 hours of new video content per minute), management, organization and provision of these content items is drastically hindered due to the lack of sufficient and structured metadata associated therewith.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
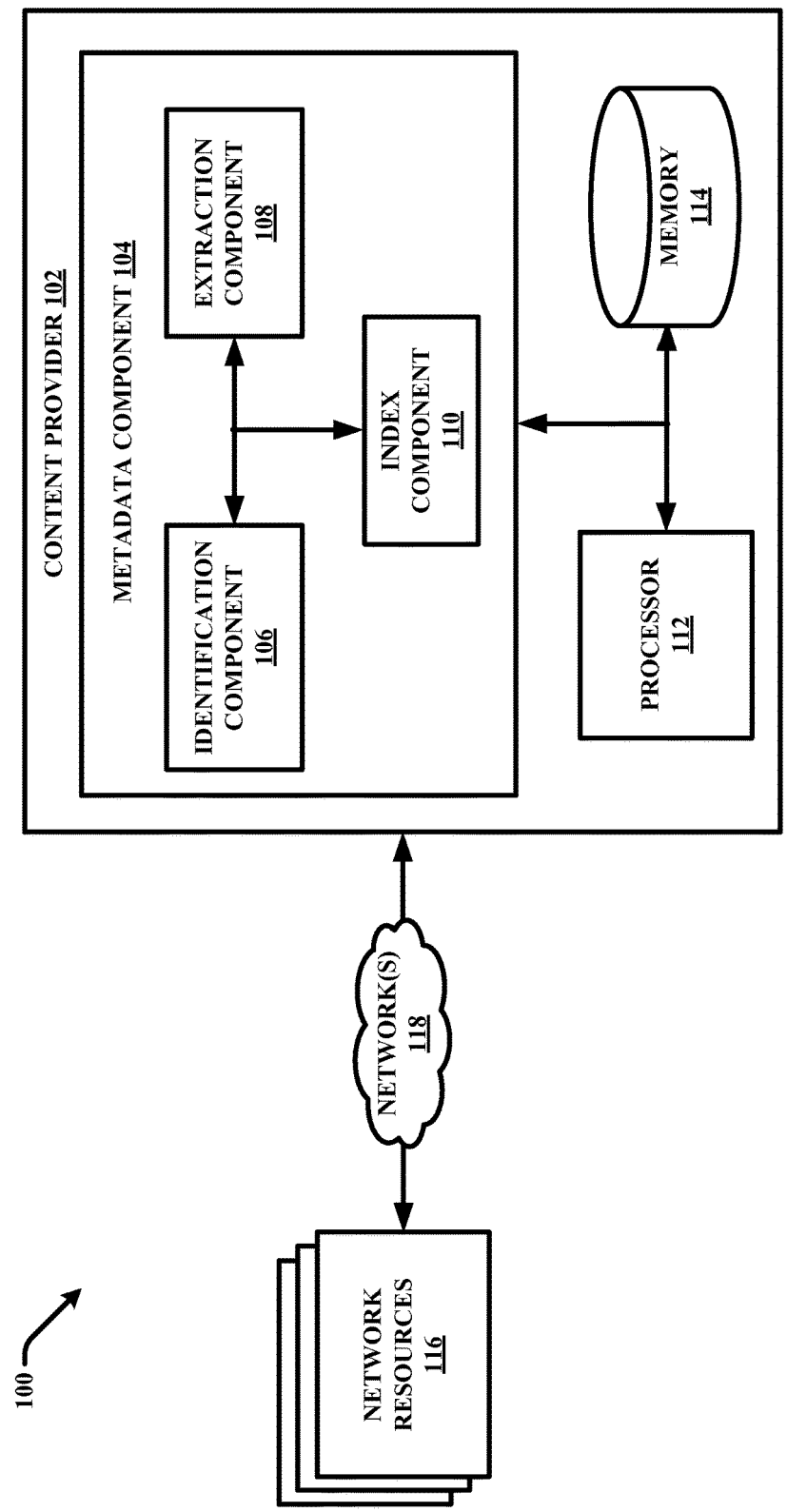
FIG. 1 illustrates a high-level block diagram of an example system configured to extract metadata associated with content items from network resources referencing the content items in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

By way of introduction, the subject matter described in this disclosure relates to systems and methods for gathering descriptive metadata for a content item from one or more resources, accessible via a network, that include a reference to the content item. The term "resource" as used herein refers to any 'thing' or 'entity' that can be identified, named, addressed or handled, in any way whatsoever, in the web at large, or in any networked information system. For example, resources described herein that can include a reference to a content item can include but are not limited to, a web page, a specific region/part of a web page, an application, a document included in an application, or a document at a digital application distribution store.

The referenced content item can include any suitable data object that can be linked to or embedded in another document (e.g., a hypertext markup language (HTML) file), such as a video file, an audio file, a text file, an image file, etc. As used herein, a "reference" to a content item can include a form of data object that identifies a content item provided at a remote location/resource from the location/resource at which the reference occurs. For example, a reference can include a link or hyperlink to the content item, an embedded representation of the content item, and/or another form of data object that identifies the content item (e.g., a thumbnail image or icon representing the content item).

It is noted that an embedded representation of a content item can refer to data representative of a content item, provided and controlled by a first network resource, that that is embedded or included within a second network resource. For example, the data can include embedded code (e.g., HTML code) for the content item that is embedded, within the code (e.g., HTML code) that describes the structure, functionality, and semantic content of a web document or application. In another example, the data corresponding to an embedded content item can include an inline frame (iframe) that includes a representation of the content item. It is further noted that a link or hyperlink can include a computer readable data string that directs a device to a location/resource of a content remote from the location at which the data string is located (e.g., a different website, a different webpage, a different application, a different location within a same document, etc.).

In various embodiments, the disclosed techniques for gathering descriptive metadata for content items are employed by a content providing system that includes one or more devices configured to store and provide a plurality of content items to client devices via a network accessible platform, such as a website or native client application. The content providing system can employ various techniques to identify references to the content items, (e.g., links to the content items, or embedded representation of the content items), at various network resources/locations internal and/or external to the content providing system. In an aspect, the content providing system can employ a web crawler configured to browse the World Wide Web in a methodical manner to identify links or embedded code for content items, provided by the system, at various internal and/or external network resources. For example, the resources can include webpages affiliated with entities external to the content providing system and/or webpages affiliated with the content providing system (e.g., user account/profile pages, user channel pages, etc.). According to this example, the web crawler can be configured to search for and identify resources that include data (e.g., HTML code) that includes a particular content item identifier (e.g., a unique string of characters) employed by the content providing system to identify the content item, and/or an anchor at the content providing system.

In another aspect, the content providing system can identify external resources (e.g., web pages, applications, etc.) at which content item links and/or embedded codes (to content items provided by the content provider) are located based on received requests to access the respective content items originating from the external sources. For example, the content providing system can identify the referral source (e.g., a webpage, an application) at which a link to a content item, provided by the system, was selected. In another example, the content providing system can identify the resource at which a content item provided by the content provider is embedded in response to a request, received from the resource, to provide the embedded content item. According to this example, the request is received by the content providing system in response to selection of the embedded content item for rendering at the source.

For example, in one or more exemplary embodiments, the content providing system is a media system configured to receive user uploaded media items (e.g., videos or audio files), and provide/deliver the media items to clients as streaming media via the Internet. In an aspect, the media system can identify network resources that include links to media items, provided by the media provider, based on selection of the links at the respective network resources. Under this context, the network resources are referred to as "referral resources." For example, the media provider can identify a network resource associated with an incoming request to access/play a media item at the media provider's website location of the media item (e.g., the watch page for the media item). According to this example, the request can include information identifying the network source at which a link to the media item was selected and the media item.

In another aspect, the media system can identify network resources that include embedded representations of the media items in response to reception of requests to stream the embedded media item to the respective network sources. According to this aspect, when an embedded video or song, provided by the media provider, is selected for playing (or begins automatically playing) at a network source external to the media system, the media system is configured to receive a request to stream the media item to the external source (e.g., to effectuate playing of the media item at the external source). The request will include information identifying the external source and the media item.

In accordance with various embodiments, after a network resource including a reference to a content item (e.g., a link to the content item or an embedded representation of the content item), has been identified, data associated with the reference to the content item and/or the network resource is extracted as descriptive metadata. In particular, since various content items such as videos, music files, etc., can be linked to or embedded across the web at various resources, the subject systems and methods take advantage of the additional metadata that these incoming links provide. For example, metadata can be extracted from the title of a web page including a reference to a content item, the full contents of the web page, the contents of blocks of text of the web page before and after the content item link or embed, and/or the title provided at the web page that precedes a the link or the embed.

In an aspect, when the reference to the content item includes a link to the content item or an embedded representation of the content item, descriptive metadata can be extracted from a uniform resource identifier (URI) for the resource, a uniform resource locator (URL) for the resource, a title of the resource, media content at the resource, or text content at the resource. In another example, descriptive metadata can be extracted from characters included in, or associated with, the link to the content item or the embedded representation of the media content item. For instance terms included in a URL link to a content item or embedded code for an embedded content item can be extracted as metadata.

In another aspect, descriptive metadata can be extracted from text at the resource included within a defined region relative to the reference to the content item. For example, text located near or adjacent to (e.g., directly above or below) a content item link or an embedded content item can be extracted as metadata. With respect to an HTML document for the reference web page, the defined region can be restricted to terms/characters located within a fixed character/spacing distance from the HTML code for the link or the embedded code. In yet another example, when the reference to the content item is included as a feed item within a feed at the resource, descriptive metadata can be extracted from other data (e.g., text and media) included with the feed item. For instance such text could include a title provided for an embedded content item, or user comments provided for the embedded content item within the feed item post.

In one or more embodiments, the descriptive metadata that is gathered/extracted for a content item from one or more network sources is associated with the content item (e.g., in a database, in an index, etc.). In some aspects, the descriptive metadata is analyzed and filtered to generate a set of descriptive terms to associate with the content item that most accurately and distinctly identify the content item. For example, reoccurring terms for a media item included in several different extractions of metadata for the media item from a plurality of different network sources can be considered more accurate descriptors of the media item then terms that occur only once or twice. According to this example, terms that reoccur frequently (e.g., relative to other terms and/or a threshold value) can be selected for association with the media item. Various additional filters/techniques for selecting a set of terms included in extracted metadata for a content item that are considered accurate and strong descriptors for the content item are contemplated and discussed infra.

The extracted/gathered metadata that is associated with a content item can be used by systems described herein for various purposes. In an exemplary embodiment, the gathered descriptive metadata is used to facilitate finding other content items that are similar to the content item. For example, gathered metadata for a content item, such as descriptive terms for a video (e.g., terms related to the video's title, producer, cast, genera, publication date, etc.), can be matched against an index or matrix of structured metadata data corresponding to descriptive terms respectively associated with other content items/videos. Correspondence between the gathered metadata for the content item and descriptive terms for another content item can facilitate determining a degree of similarity between the content item and the other content item. Using this technique, clusters of same or similar content items can be identified. This can make database navigation and data retrieval more efficient, and can promote more efficient content identification. In another embodiment, gathered descriptive metadata for a content item can facilitate searching for the content item (e.g., via a keyword search).

In one or more embodiments, a system can include a computer-readable storage media having stored thereon computer executable components, and a processor configured to execute computer executable components stored in the computer-readable storage media. These components can include an identification component configured to identify a resource, accessible to the system via a network, that includes a reference to a media item, and an extraction component configured to extract metadata associated with the resource and the reference to the media item. The system can further include an index component configured to associate at least a portion of the metadata with the media item in a data store, and a matching component configured to identify one or more reference media items based on correspondence between the metadata and reference metadata respectively associated with the one or more reference media items.

In another embodiment, a method is provided that includes using a processor to execute computer executable instructions stored in a memory to perform various acts. These acts can include identifying a resource, accessible to a system via a network, that includes a reference to a media item, extracting metadata associated with the resource and the reference to the media item, associating at least a portion of the metadata with the media item in a data store, and identifying one or more reference media items based on correspondence between the metadata and reference metadata respectively associated with the one or more reference media items.

In various additional embodiments, a computer readable storage device is provided that includes instructions that, in response to execution, cause a system including a processor to perform operations, including determining that a resource of a network comprises a reference to a media item, wherein the media item is a reference media item comprised in a reference database, extracting unstructured descriptive data, associated with the reference, from the resource, and matching the unstructured descriptive data to one or more reference media items comprised in the reference database.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

In implementations, the components described herein can perform actions, in real-time, near real-time, online and/or offline. Online/offline can refer to states identifying connectivity between one or more components. In general, "online" indicates a state of connectivity, while "offline" indicates a disconnected state. In an aspect, offline merging can prevent service interruptions, end-user quality degradation, and the like.

While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other. It is noted that while media items are referred to herein, the systems and methods of this disclosure can utilize other content items.

Referring now to FIG. 1, presented is an example system 100 configured to gather/extract descriptive metadata for content items from network resources that reference the content items in accordance with various aspects and embodiments described herein. System 100 further associates the extracted metadata with the respective content items (e.g., with the content items themselves, in an index accessible to the system, in an database accessibly to the system, etc.). The metadata respectively associated with the content items can be employed by system 100 and the like or another device/system to facilitate various operations, including but not limited to, identifying other content items having same or similar content as the respective content items, classifying the content items, facilitate keyword searching for the content items, and the like.

Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a content provider 102, and one or more network resources 116. The various components of system 100 and other systems described herein (e.g., content provider 102, the respective components of content provider 102, one or more network resources 116, etc.) can be connected either directly or via one or more networks 118. Such network(s) 118 can include wired and wireless networks, including but not limited to, a cellular network, a wide area network (WAD, e.g., the Internet), a local area network (LAN), or a personal area network (PAN). For example, content provider 102 can communicate with a network resource 116 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks. Content provider 102 can also include memory 114 that stores computer executable components, and a processor 112 that executes the computer executable components stored in the memory 114. For example, one or more of the components employed by content provider 102 (e.g., metadata component 104) can be stored in memory 114.

It is to be appreciated that the system 100 can be used in connection with implementing one or more of the systems or components shown and described in connection with other figures disclosed herein. It is noted that all or some aspects of system 100 can be included in other systems/devices such as servers, computing devices, smart phones, and the like. In addition, although metadata component 104 is depicted internal to the content provider 102, in various aspects, metadata component 104 (or one or more components of metadata component 104) can be located an entity remote from the content provider 102 and accessed by the content provider 102 via a network (e.g., a network 118). As used in this disclosure, the term "user," or "creator" refers to a person, device, entity, system, or combination thereof.

Content provider 102 can include metadata component 104 to facilitate finding and extracting metadata from various network resources 116 for content items based on inclusion of references to the content items at the various network resources 116, respectively. These network resources 116 can include an 'entity' that can be identified, named, addressed or handled, in any way whatsoever, in the web at large, or in any networked information system. For example, network resources 116 can include but are not limited to, a web page, a specific regions/part of a web page, an application, a document included in an application, or a document at a digital application distribution store. In some aspects, the content items for which the metadata is gathered are provided by and located internal to the content provider 102 (e.g., via one or more devices employ by the content provider). In other aspects, the content items can be provided by and located at one or more network resources 116 external to the content provider 102.

For example, content provider 102 can include an entity configured to provide content or content items to a user at a client device (not shown) via a network (e.g., the Internet). For example, content provider 102 can include a website or application configured to present pictures, articles, blogs, videos, or other types of content items to client devices via a network. According to this example, the content provided by the website or application can be configured for downloading, streaming or merely viewing at a client device via the network. In another aspect, content provider 102 can include an information store that provides access to data included in the information store via a network.

As used herein, the term content item refers to any suitable data object that can be linked to and accessed or otherwise shared via a network and includes but is not limited to: documents, articles, messages, website, web pages, programs, applications, user profiles, and media items. In an aspect, a content item includes a data object that can be identified by a URL and/or a URI. The term media content or media item can include but is not limited to streamable and dynamic media (e.g., video, live video, video advertisements, music, music videos, sound files, animations, and etc.) and static media (e.g., pictures, thumbnails). The term media content or media item can also refer to a collection of media items such as a playlist including several videos or songs, or a channel including several videos or songs associated with a single media creator or curator.

In an exemplary embodiment, content provider 102 is an Internet based streaming media provider configured to provide streamed media to client devices over a network 118. For example, content provider 102 can include a media provider that has access to a voluminous quantity (and potentially an inexhaustible number) of shared media (e.g., video and/or audio) files. The media provider can further stream these media files to one or more users at respective client devices of the one or more users over a network 118. The media can be stored in memory associated with the media provider (e.g., memory 114 and/or other connected memory devices) and/or at various servers employed by the media provider and accessed by client devices using a networked platform (e.g., a website platform, a native client application) employed by the media provider.

In various embodiments, content provider 102 can receive and distribute (e.g., in a shared environment) user uploaded/provided content. For example, where content provider is a streaming media provider, the media provider can include a website that allow users to upload video and music files for sharing/distribution to other users via the website. The website can also facilitate finding music and video files to download, listen to, or view, as authorized as well as connect with other user's regarding media consumption and collaboration.

When users upload or provide content to a content provider 102 for access by other users or for various other purposes, the content provider 102 generally has little or no control over the metadata that is included with the content. Often, the content items received by a content provider 102 from a user (e.g., an uploaded video or music file) have little or no metadata associated therewith or the metadata associated therewith is low quality. Further, even when users do include some metadata with an uploaded content items, the metadata is often "unstructured." Content providers, such as content provider 102 that store and provide content items can use structured metadata associated therewith to facilitate efficient storing, searching, and retrieval of the content items. However, content providers cannot rely on users to provide sufficient and structured metadata with uploaded content items. For content providers that receive vast amounts of content items over time (e.g., such as a media sharing system that receives over 300 hours of new video content per minute), management, organization and provision of these content items is drastically hindered due to the lack of sufficient and structured metadata associated therewith.

In one or more embodiments, content provider 102 can include metadata component 104 to gather metadata for association with a content item by extracting the metadata from one or more network resources 116 that include a reference to the content item (e.g., that include a link to the content item or an embedded representation of the content item). Various aspects of system 100 and the like are exemplified with content provider 102 as a streaming media provider configured to receive and distribute uploaded media items. However, it should be appreciated that various aspects of system 100 and the like can be employed by a variety of content providers configured to receive and provide a variety of content items.

Metadata component 104 can include identification component 106, extraction component 108 and index component 110. Identification component 106 is configured to identify network resources 116, accessible to the content provider 102/metadata component 104 via a network, that includes a reference to a content item (e.g., a media item where the content provider 102 is a media provider). For example, the content item can include a newly uploaded/received content item that has little, no, or poor metadata associated therewith (e.g., merely a user provided title). In another example, the content item can include a content item that has been previously associated with metadata. According to this example, metadata component 104 can facilitate finding new and improved metadata to associate with the content item.

In various embodiments, the identification component 106 can analyze a plurality of network resources to identify information at the respective resources corresponding to a reference to a media item provided by the content provider 102. For example, the network resources can be a webpage, an email, a blog, a social network hosting application, and the like. In an aspect, entities can be analyzed continually and/or at intervals. For example, the identification component 106 can perform web crawling to detect references to content items provided by content provider 102. Web crawling can include requesting resources of a network, receiving the resources as input, and analyzing the resources to identify information indicative of a reference (e.g., URLs, URIs, item identifiers) to a content item provided by content provider 102.

In an aspect, identification component 106 can continuously scan for references to content items, provided by content provider 102, at various network resources 116. Each time a new reference is identified, identification component 106 can inform extraction component 108 which in turn can extract the metadata associated therewith. In other aspects, the identification component 106 can perform detection of network resources 116 referencing media items at a predetermined time. For example, the identification component 106 can perform detection at a time where network traffic meets a determined threshold (e.g., when few users are online, when a media item receives a certain number of views, etc.). In another aspect, the identification component 106 can perform detection based on user input, based on a determined quality and/or quantity of metadata associated already associated with a content item for which, and/or based on a threshold confidence level.

In other embodiments, identification component 106 can identify network resources 116 that include a reference to a media item (e.g., provided by content provider 102) based on receiving input that includes a request to access or play a media item. Identification component 106 can also identify network resources 116 that include a reference to a media item based on received request to share or post a link or embedded representation of a media item, provided by the media provider, at an external network resource 116. According to these embodiments, the identification component 106 can receive a notification of a reference to a media item. For example, a notification can be generated upon a user utilizing a computing device to embed, link to, or otherwise access a media item. As an example, a user can utilize an interface provided by the content provider 102 to embed a media item provided by the content provider 102 at an external network resource 116. Using the interface the user can request the embedded code utilized to embed the media item. The generation of the code by the content provider and/or the request can serve as notification of embedding.

In another example, selection of a link, located at an external network resource 116, to a media item provided by content provider 102, can generate a request to access the media item. This request is received by the content provider 102 and can include information identifying the network resource at which the link was selected and the media item. Accordingly identification component 106 can monitor requests to identify the reference from which they originated. In yet another example, when an embedded media item is played at the external network resource at which it is embedded (e.g., a feed of a social networking source external to the content provider 102), the media item is sourced/streamed from the content provider 102. Accordingly, the identification component 106 can monitor requests to stream media items to particular network resources 116 in response to initiation of playing of an embedded representation of the media item at the particular network resources.

In various embodiments, identification component 106 can store information identifying content item references, types of references (e.g., link, embed, etc), and/or information identifying locations to references for later use. The identification component 106 can also communicate an instruction to the extraction component 108 to initiate extraction of metadata associated with a media item at the identified network resources 116 respectively including references to the media item.

After a network resource 116 is identified that includes a reference to a content item, such as a media item provided by content provider 102, the extraction component 108 is configured to extract metadata associated with the resource and/or the reference to the media item. For example, identification component 106 can extract metadata associated with a network resource that embeds, links to, or otherwise references a content item, particularly a content item provided by content provider 102. The entity can be a page on a website (webpage), an email, or the like. The extraction component 106 can determine and/or select data to extract. For example, the extraction component can select data associated with a title of a webpage, metadata of the webpage, data associated with the title of a link, data based on proximity to the reference of the content, and the like.

Figure 2:
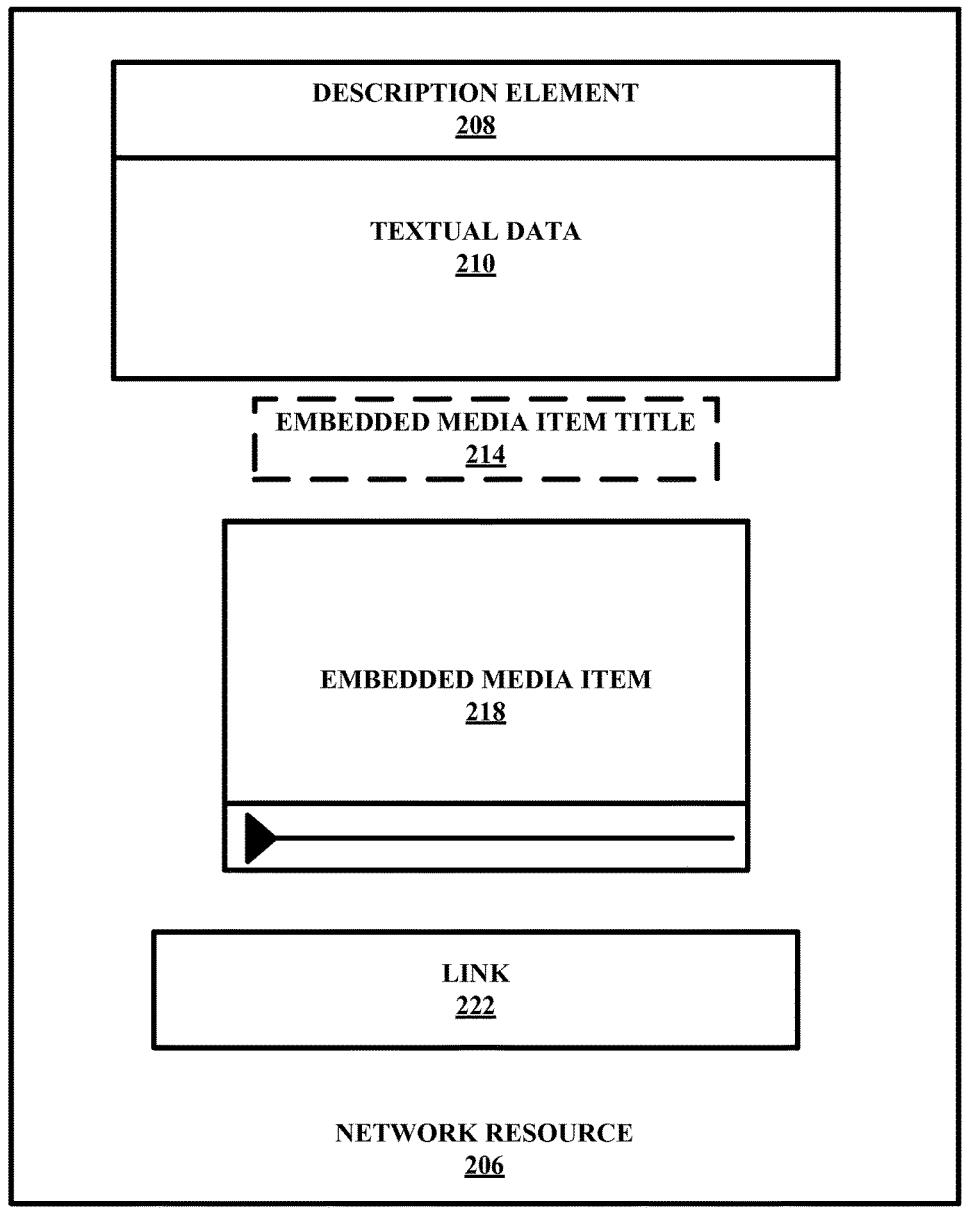
FIG. 2 illustrates a diagram of a network resource that references a media item(s) in accordance with certain embodiments of this disclosure.

For example, FIG. 2 depicts an example interface 200 employed by a network resource (e.g., a webpage, an application page, an email, etc.). Interface 200 includes an embedded media item 218 and a link 222 to a media item. Interface 200 further includes various elements (e.g., description element 208, textual data 210, and embedded media title) from which metadata associated with the embedded media item 218 and/or the link 22 to the media item, can be extracted.

With reference to FIGS. 1 and 2, system 100 can receive input as a webpage, email, access request to a media item, a detected embedded media item, resource of a network, and the like. The extraction component 108 can extract data from the input as metadata. Extracting the metadata can include selecting data items (or features of the input), storing the data items, classifying the data items, and the like. For example, the extraction component 108 can receive or access a webpage containing an embedded media item, extract metadata from the webpage, and determine a level of relation of the extracted metadata to the media item.

Data associated with the network resource 206 can be extracted and utilized for identification of the media item by system 100 and/or other systems and methods described herein. It is noted that the interface 200 employed by network resource 206 is provided as an example and system 100 and and/or other systems and methods described herein can utilize any layout of a webpage, other resources, and/or other entities. For example, in various embodiments, a suitable network resource at which a link to a media item and/or an embedded media item is located includes a webpage or application that includes a scrollable feed (e.g., such as a social networking resource). The feed can include various feed items or posts that are regularly updated. In an aspect, a link to a media item or an embedded media item can be included as a feed item or post on the feed. In addition to the link or the embedded media item, the feed item or post can also include text data describing the media item or comments provided by users in association with the feed item.

With reference to interface 200, the extraction component 108 can extract metadata associated with the network resource 206 from the description element 208, the textual data 210, the embedded media item 218, the embedded media item title 214, and the link 222 to a media item (e.g., incoming link text). In another aspect, the extraction component 108 can extract metadata associated with the network resource 206, anchor metadata that stores meta-information of data objects that do not change over time (e.g., creation data and time), data associated with advertisements on the webpage, data associated with a home page linked to the webpage, data associated with other links or embedded items on the webpage, and the like.

In an aspect, the extraction component 108 can initiate extraction based on an occurrence of a triggering event, such as the resource passing a quality or credibility requirement, the number of detecting references meeting a threshold, and the like. For example, a particular media item may be defined as a "popular media item" based on data associated with the media item, such as a number of references, a number of access attempts, a frequency of references and/or access, and the like. In an aspect, a popular media item can be repeatedly referenced by one or more webpage(s) in a relatively short period of time, thus extraction may not always be ideal upon detection of every reference.

Index component 110 is configured to associate at least a portion of extracted metadata for a content item with the content item. For example, index component 110 can generate a metadata index that associated extracted metadata terms for a content item with the respective content items. The index can be stored in memory 114 and/or at a repository accessible to content provider.

Figure 3:
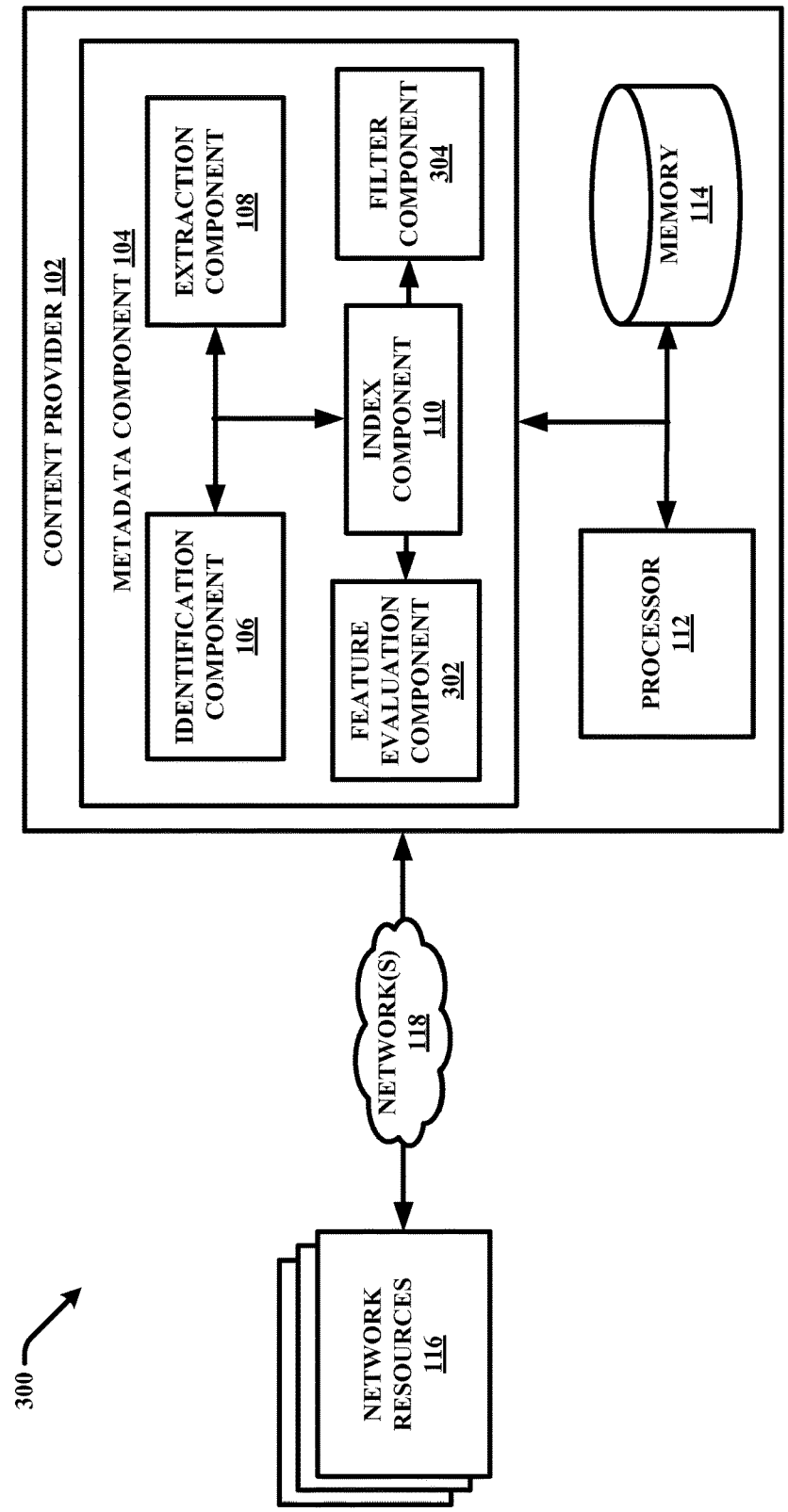
FIG. 3 illustrates a high-level block diagram of another example system configured to extract metadata associated with content items from network resources referencing the content items in accordance with certain embodiments of this disclosure.

FIG. 3 illustrates a high-level block diagram of another example system 300 configured to extract metadata associated with content items from network resources referencing the content items in accordance with certain embodiments of this disclosure. System 300 can include same or similar structures, features and functionalities as system 100 with the addition of feature evaluation component 302 and filter component 304 to metadata component 104. Repetitive description of like elements employed in respective embodiments of systems described herein is omitted for sake of brevity.

The metadata extracted by extraction component 108 for a content item is generally unstructured in the sense that it can include terms and term/character patterns that are not employed by the content provider 102 in association with describing and classifying content items provided thereby. In addition, not all of the extracted metadata may be useful with respect to establishing a descriptive set of metadata for a content item.

In various embodiments, system 300 can include feature evaluation component 302 and filter component 304 to facilitate determining what metadata features/terms included in extracted metadata should be retained and associated with a content item by index component 110. For example, in various aspects, extraction component 108 can extract all potential metadata associated with a reference to a content item and the network resource 116 that includes the reference. Feature evaluation component 302 and filter component 304 can then analyze the extracted metadata to identify a subset of the extracted metadata to associate with the content item (e.g., via index component 110). In other aspects, rather than extracting all metadata associated with a content item reference and the network resource that includes the reference, extraction component 108 can employ feature evaluation component 302 and filter component 304 to identify a suitable subset of the metadata prior to extraction. The extraction component 108 can then extract only the identified subset and the index component 110 can associate the extracted subset of data with the content item.

In various embodiments, feature evaluation component 302 is configured evaluate various features (e.g., terms or elements) in metadata associated with a reference to a content item and/or the network resource that includes the reference (e.g. the extracted metadata or metadata available for extraction), to determine a degree to which the feature is relevant and useful in association with providing a distinctive and accurate description of the content item. For example, with reference to FIGS. 3 and 2 the description element 208 can be a title of a news article comprised by the textual data 210. The news article may reference a media item that has a weak and/or low association with the description element 208, yet is embedded as the embedded media item 218. Accordingly, the feature evaluation component 302 can determine that data associated with the description element 208 does not have a strong relation to the embedded media item 218.

In an embodiments, feature evaluation component 302 is configured to determine scores for respective metadata features that reflect a degree to which the feature is relevant and useful in association with providing a distinctive and accurate description of the content item. The score value can be based on one or more weighted factors, included by not limited to proximity to subject items, relation to structured metadata, whether data changes or does not change over time (e.g., anchor metadata which may not change over a time and may be given a greater weight), content of other items on a page, a history of relevance of items associated with the network resource 206, and the like. For example, the feature evaluation component 302 can determine relative positions of items of interface 200 with respect to the embedded media item 218 and/or the link 222 to the media item. In an aspect, feature evaluation component 302 can grant a higher score to items based on proximity to embedded media item 218. For instance, the embedded media item title 214 can be given a higher score than the description element 208. It is noted that proximity can refer to a relative location as depicted on an interface device (e.g., monitor), a relative locations based on code of an entity (e.g., HTML code of a webpage), based on a comparison of content that generates a distance that describes a level of similarity, and the like.

In another aspect, feature evaluation component 302 can analyze content of the features of interface 200 to facilitate scoring metadata features. For example, feature evaluation component 302 can analyze key phrases, identification of irrelevant items, identifying frequency of items, and the like. Key phrases, such as "watch the video here", "see the video below", "the video of", and the like, can indicate that a particular item or aspect of the content is relevant or not relevant to the subject items (e.g., embedded media item 218 and/or link to the media item 222). As an example, the feature evaluation component 302 can determine the textual data 210 includes a phrase "watch the video of" and can determine textual metadata following the phrase is likely to be relevant.

In another aspect, feature evaluation component 302 can evaluate a collective body of extracted metadata (e.g., from many different resources) for a particular content item. The feature evaluation component 302 can identify terms that are repeatedly associated with the content item and associated a higher confidence score with these terms. In particular, the more frequently a term is used to describe a content item, the more likely that it is generally accepted as relevant descriptor for the content item. Similarly, the less frequently a term is used to describe a content item, the less likely that it is generally accepted as relevant descriptor for the content item. Accordingly, feature evaluation component 302 determine scores for different terms associated with a collective body of metadata for a content item base on the frequency of reoccurrence, wherein the higher the frequency of reoccurrence, the higher the confidence score.

In another aspect, feature evaluation component 302 can be configured to associate higher confidence scores with capitalized terms. For example, when analyzing a body of text, those terms which are capitalized are generally include names, titles, locations, etc. Accordingly, when distinguishing relevant descriptive terms for a media item, (e.g., as a title of the media item, a name of the artist or band, a name of the producer, a location of a venue, etc.) among a collection of metadata terms, feature evaluation component 302 can look for capitalized terms and consider the capitalized terms as having a stronger likelihood of relation to the media item then non-capitalized terms. Those feature evaluation component 302 can give capitalized terms a higher confidence score over non-capitalized terms.

Still in yet another aspect, feature evaluation component 302 can employ a database of reference terms that include know terms or types of terms which are considered relevant to a particular content item type. Feature evaluation component 302 can further associated higher confidence scores with terms identified in extracted metadata that correspond to know terms. For example, with respect to videos and songs, metadata component 104 can have access to a previously determined list of potential metadata terms or types of terms that have been previously used to describe content items. For instance, such terms can include but are not limited to: names of known artists, names of known bands, names of known albums, names of known actors, names of known producers, names of known videos, names of known channels, names of known channel creators, etc. In another example, such terms could include terms for known genera's of music or movies. In another example, such terms can include descriptor adjectives that are often used to describe various aspects of a video or song (e.g., high action, violence, love, scary, etc.).

In various implementations, feature evaluation component 302 can also determine relevance of items of network resource 206 as a whole based on a history associated with items of the network resource 206. For example, the feature evaluation component 302 can determine that metadata previously extracted from network resource 206 was unreliable when extracted in past iterations. As another example, an author associated with an article may embed media items that are not relevant to the author's articles. The feature evaluation component 302 can therefore determine articles by the author should be given a lower score and/or avoided.

In one or more embodiments, feature evaluation component 302 can utilize an artificial intelligence model that can facilitate inferring and/or determining relevance and usefulness of metadata features in association with providing an accurate description of a content item. As used herein, the term "inference" refers generally to the process of reasoning about or inferring states of the system, environment, and/or user from a set of observations as captured via events and/or data. Inference can identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The feature evaluation component 302 can employ any of a variety of suitable artificial intelligence (AI)-based schemes as described supra in connection with facilitating various aspects of the herein described invention. For example, a process for learning explicitly or implicitly how parameters are to be created for altering descriptive data according to inconsistencies in a channel based on change events can be facilitated via an automatic classification system and process. Inferring and/or learning can employ a probabilistic and/or statistical-based analysis to prognose or infer an action that is to be executed. For example, a support vector machine (SVM) classifier can be employed. Other learning approaches include Bayesian networks, decision trees, and probabilistic classification models providing different patterns of independence can be employed. Learning as used herein also is inclusive of statistical regression that is utilized to develop models of priority.

As will be readily appreciated from the subject specification, the subject innovation can employ learning classifiers that are explicitly trained (e.g., via a generic training data) as well as implicitly trained (e.g., via observing user behavior, receiving extrinsic information) so that the learning classifier is used to automatically determine according to a predetermined criteria which action to take. For example, SVM's can be configured via a learning or training phase within a learning classifier constructor and feature selection module. A learning classifier is a function that maps an input attribute vector, x=(x1, x2, x3, x4, xn), to a confidence that the input belongs to a learning class—that is, f(x)=confidence(class).

Filter component 304 is configured to select a subset of metadata features to associate with a content item based on the feature evaluation applied by feature evaluation component 302. For example, filter component 304 can identify or select, a subset of the one or more features included in extracted/identified metadata based on the respective confidence score values associated therewith. For instance, the filter component 304 can select a subset of the features that are associated with confidence scores above a threshold score. The index component 110 can then associate only the subset of the one or more features with the media item.

It should be appreciated that metadata component 104 can regularly revaluate metadata associated with a content item. For example, after a subset of metadata features have been associated with a content item by index component 110 in accordance with the features and functionalities of metadata component 104 described above, metadata component 104 can continue to find additional metadata for the content item and/or to revaluate the metadata associated with the content item. For example, metadata component 104 can regularly look for new references to the content item, extract/evaluate the metadata associated with the new references, and analyze the new metadata (e.g., using feature evaluation component 302 and filter component 304). Metadata component 104 can further direct index component 110 to associate some or all of the new metadata with the content item and/or update the existing metadata associated with the content item based on its evaluation.

Figure 4:
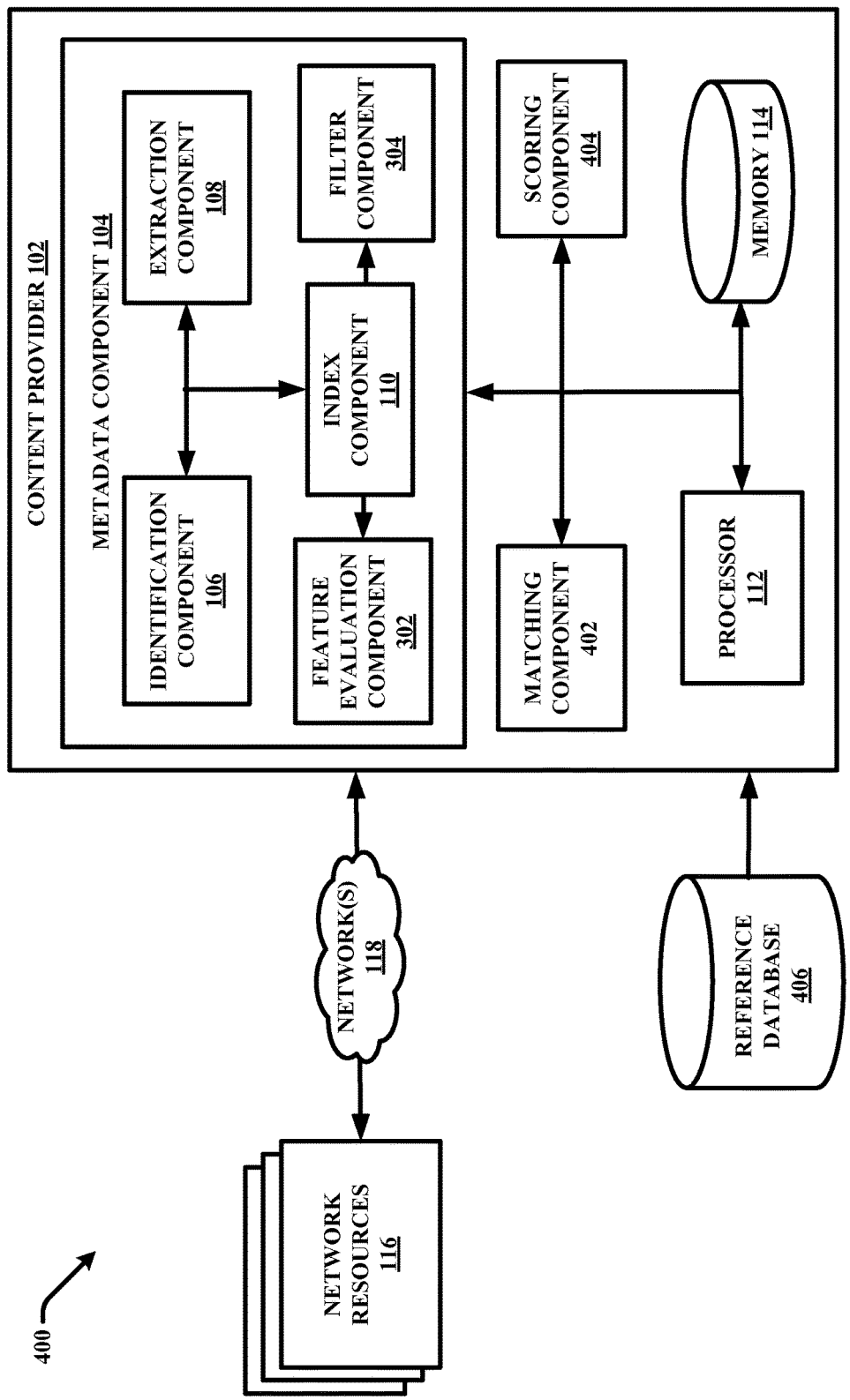
FIG. 4 illustrates a high-level block diagram of an example system configured to extract metadata associated with content items from network resources referencing the content items and employ the metadata to identify other similar content items in accordance with certain embodiments of this disclosure.

FIG. 4 illustrates a high-level block diagram of an example system 400 configured to extract metadata associated with content items from network resources referencing the content items and employ the metadata to identify other similar content items in accordance with certain embodiments of this disclosure. System 400 can include same or similar structures, features and functionalities as system 300 with the addition of matching component 402 and scoring component 404. Repetitive description of like elements employed in respective embodiments of systems described herein is omitted for sake of brevity.

Matching component 402 is configured to facilitate identifying content items based on correspondence between metadata respectively associated with the respective content items. For example, correctly identifying new content item files received by content provider 102 can allow the content provider 102 to accurately index the content within a structured database in such a way that efficiencies in database space utilization, search and data retrieval can be realized. Accurately matching extracted and processed metadata for a newly uploaded content item to structured metadata that has been previously associated with other content items can open up possibilities for clustering groups of content items which all match the same reference content item. This can make database navigation and data retrieval more efficient, and can promote more efficient content identification.

In various embodiments, matching component 402 is configured to perform metadata matching to facilitate identifying potential reference content items that include the same or substantially the same content. For example, matching component 402 can perform metadata matching to identify a set of reference videos that are associated with metadata having a defined degree of similarity to the metadata of a particular video (e.g., a newly uploaded video). After this set of reference videos are identified using metadata matching, matching component 402, (or another entity of system 400), can perform content analysis between the particular videos and the reference videos in the set to more precisely determine a degree to which the content of particular video is the same or substantially the same as content included in a reference video.

For example, matching component 402 can take extracted/processed metadata (e.g., that has been extracted/processed via metadata component 104) for a particular content item (e.g., a newly uploaded/received content item) as an input. The matching component 402 can further compare this metadata against a reference database 406 that includes an index of reference content items that have been previously and respectively associated with structured metadata. Based on the comparison, the matching component 402 can identify a subset (e.g., one or more) of the reference content items whose structured metadata has a defined degree of similarity to the extracted/processed metadata for the particular content item.

In response to identification of a reference content item whose metadata has a defined degree of similarity to the extracted/processed metadata for the particular content item being evaluated (e.g., the new content item), the matching component 402 can include this reference content item in a set of candidate reference content items that are to be further evaluated using additional content based techniques to determine a degree to which the particular content item and the reference content item include same or similar content. For example, with respect to a media item, the additional processing can include usage of existing video and audio content fingerprinting and/or analysis of audio and video features in association with a pair wise comparison using a distance function (e.g. L2 distance).

Such a content based comparisons between media items is used to provide a precise determination as to the degree to which a newly uploaded video or song includes the same or substantially the same video or audio content. Such an evaluation is essential for a media sharing system that receives and publishes user generated/provided media content for policing and preventing unauthorized usage of unauthorized content. However, the various existing content based evaluation techniques used to identify media items having same or substantially the same content is highly technical and requires a significant amount of computation time and resources. In addition, these additional processing techniques are prone to error. For example, it is often difficult to account for pitch shifting using audio fingerprint based matching techniques for songs that are versions of one another yet have slight differences in pitch or key.

Accordingly, by using metadata matching to restrict the potential set of candidates for which to apply deeper content based matching (e.g., audio/video fingerprinting, pitch shift analysis, etc.), system 400 significantly improves the efficiency and accuracy of existing content identification and matching, particularly media (e.g., video and audio) content matching. Thus, the various features and functionalities of system 400 are not directed to performing mathematical operations on a computer alone. Rather, the combination of elements (e.g., metadata component 104 and matching component 402, as well as scoring component 404) impose meaningful applications of a new processes (e.g., finding, extracting, evaluating metadata from various external sources for a content item and employing the metadata to identify a subset of other content items having similar metadata) to improve an existing technology (content matching/identification) by improving the efficiency and accuracy of content based content matching/identification. Further, in addition to improving efficiency and accuracy, the computation time and associated resources required by computing devices to perform content matching/identification is improved (e.g., less memory, fast processing time, fewer dedicated resources, etc.). These improvements to existing content based matching/identification techniques have a significant impact when employed by media systems that regularly receive and manage a large amount of newly uploaded media (e.g., 300 hours of new video per minute).

Furthermore, it is particularly noted that a human cannot perform the subject content analysis and match detection on the scale required by modern Internet based media providing systems. For example, it would take days, weeks and possibly months for a human being to match 300 hours of video content to an existing repository of reference media content. Considering the fact that current Internet based media sharing systems receive 300 hours of new video per minute, it is readily apparent that a human could not possibly perform the required content analysis and processing provided by system 400 the like.

In an exemplary embodiment, matching component 402 can facilitate finding media items that include same or similar content based on correspondence between the metadata respectively associated therewith. In particular, matching component 402 can compare the extracted metadata assigned to a new media item to the reference metadata respectively associated with other content items identified in the reference database 406. The matching component can further identify a subset of the other content items that include same or similar metadata as the new content item. In an aspect, scoring component 404 can evaluate and score the subset of reference media items to determine a degree to which the respective reference media items have same or similar content as the new media item.

The meaning of "match" or "matching" in this context can include various aspects of determining a similarity or correspondence between things. For example, "matching" can refer to comparing elements (or aspects) of the metadata with elements for a first content item to metadata elements for a second content item and using predefined objective criteria to determine a similarity or correspondence between the compared elements or aspects. Thus, a "match" need not refer only to things that are exact counterparts or duplicates of each other, although such counterparts are also matches. In other words, the predefined objective criteria referred to in the preceding need not require, in order to determine that given metadata elements or aspects match, that the given metadata elements or aspects be exactly the same in their content, or in their sequence, or that the given metadata elements or aspects exactly meet any other requirements; this could be unduly restrictive and exclude true matches in terms of the actual content of those things that the metadata elements or aspects describe. Instead, the predefined objective criteria can be inclusive in an effort to ensure that true matches are not excluded. Accordingly, the matching component 402 can, based on the applied metadata return results that include false positives among true matches.

The matching component 402 can employ various techniques to identify the subset of reference content item candidates whose metadata has the defined degree of similarity to the extracted processed metadata for the particular content item. For example, the matching component 402 can compare individual terms, tokens or elements, e.g., atomic units as defined by objective standards, of the extracted/processed metadata with individual terms, tokens or elements, e.g., atomic units, of the structured metadata respectively associated with the reference content items, and make a determination regarding similarity of the compared things. Additionally or alternatively, the matching component 402 can compare sequences of elements of the unstructured metadata with sequences of elements of the structured metadata, and make a determination regarding similarity of the compared things. Additionally or alternatively, the matching component can make a determination regarding similarity based on some other objective standard or measure. Additionally or alternatively, the matching component 402 can make a determination regarding similarity between the unstructured metadata and the structured metadata based on any combination of the foregoing, with an output or result as denoted by matches.

It is noted that an atomic unit can be a word or a letter, and a sequence can include a text string or a succession of words (e.g., at least two words). A determination regarding similarity based on an objective standard or measure can include the use of weighting factors, statistical information, and functions of the weighting factors and statistical information.

In one or more embodiments, scoring component 404 is configured to process the matches included in the subset of matched content items, to generate, produce, or output scoring data. The scoring data can include a score assigned to one or more (e.g., each) candidate reference content items, where the score indicates a degree of to which the extracted metadata associated with an evaluated content item corresponds to or matches the structured metadata assigned to the reference content item. In an aspect, the score can indicate or reflect a confidence (e.g., relative to a perfect score or absolute certainty or knowledge) that the candidate reference content item is a true match with the evaluated content item.

For example, scoring component can assign a score to one or more (e.g., each) of the candidate reference items based on one or more predetermined criteria. The one or more predetermined criteria can include, for example: a degree or extent to which an element of the structured descriptive information is discriminative (as expressed, e.g., by a weighting factor assigned to an element); a length or number of matching terms between the structured descriptive information and the unstructured descriptive information; and an occurrence of a same sequence or ordering of matching terms between the structured descriptive information and the unstructured descriptive information.

The scores can be used to facilitate identification of candidate reference items that likely represent "false positives", "false negatives", or other incorrect results produced by the matching component—that is, that correspond to instances where the matching component selects a candidate reference item from the reference database even though the probability is low that the candidate item is a correct match for the unstructured descriptive information, does not select a candidate reference even though the probability is high that the candidate item is a correct match, and the like. In another aspect, uploaded content can be transformed and a match of content (e.g., finger print matching, video/audio matching, etc.) can produce inappropriate results. The unstructured metadata can be utilized to alter or correct the inappropriate results or produce appropriate results. In an aspect, the scores can facilitate altering a set of candidate reference items to improve a quality of matches. For example, the scores can have an advantageous sifting or winnowing effect on the candidate reference items produced by the matching component. More specifically, based on their scores candidate reference items corresponding to false positives can be eliminated from the overall pool of candidate reference items, and operations can go forward with a higher confidence that candidate reference items remaining in the pool are correctly matched with the unstructured descriptive information. In another example, the scores can be utilized to identify appropriate candidate reference items.

Accordingly, the scoring component 404 can promote efficiencies by creating possibilities for clustering same or similar data files, facilitating improved database navigation, searching and file retrieval, and lowering the burden in subsequent processing of files for content identification. That is, by more accurately categorizing and grouping files based on operations of the scoring component, subsequent examination of files to identify their actual content can be made easier, which among other things can also promote the improved database operations described in the foregoing.

In an aspect, to generate the scores, the scoring component 404 can first normalizes the extracted/processed metadata for the particular (e.g., new) content item. The scoring component 404 can then generate N-grams and compare the N-grams to the reference index. For example, the scoring component 404 can use statistical information, such as Inverse Document Frequency (IDF) information, associated with reference metadata in the reference database 406. The IDF information can be pre-existing or can be computed. IDF information can be a measure of how frequently a token or term, such as a word, occurs in a corpus or collection of data. Accordingly, the IDF information can provide a measure of confidence in information searching and matching. For example, the more frequently a term occurs in a corpus of data, as signified by a correspondingly lower IDF value, the lower the confidence may be that a search result or match is a true match, because of the relatively high number of possible matches. On the other hand, the less frequently a term occurs in a corpus of data, as signified by a correspondingly lower IDF value, the higher the confidence may be that a search result or match is a true match, because of the relatively low number of possible matches.

The scoring component 404 can use IDF values for N-grams associated with the reference database 406. It is noted that, "N-gram" can refer to a sequence of contiguous or consecutive terms or tokens or atomic units, however defined, in a corpus of data. Thus, for example: "unigram" or "N-gram of size 1" can refer to a single term or token or atomic unit, e.g., a word; "bigram" or "N-gram of size 2" can refer to a consecutive sequence of two terms or tokens or atomic units, e.g., two consecutive words; and so on. In embodiments, the IDF values can be structured in two inverted indices, one for unigrams, and one for bigrams. Indexing can be implemented as an inverse mapping from a unigram and/or bigram to a reference in which a corresponding word or words occur, along with corresponding IDF values. Advantageously, such indexing can provide information about the separation of elements in the structured metadata, such as the separation between an artist name and a song name in music metadata.

In an implementation, the scoring component 404 can determine match scores associated with the respective matched reference media items included in a candidate set of matched media items. If the scores fall below a threshold level (e.g., threshold confidence score), the scoring component 404 can communicate an instruction to the identification component 106 to find references to existing reference media items at one or more external network resources. According to this implementation, the metadata component 104 can gather new or updated metadata for evaluation and association with a reference media item that is possibly associated with inaccurate metadata.

In some implementations, the scoring component 404 can generate scores based on comparing content of media items, such as fingerprint comparison, comparison of sub-fingerprints (e.g., audio fingerprint, video fingerprint, channel specific sub-fingerprint comparison such as a particular audio channel fingerprint comparison, etc.), audio comparison, video comparison, spectrogram comparison, and the like. In an aspect, content comparison can comprise a bitwise comparison of media items, associated fingerprints or sub-fingerprints, and/or modulation of frequencies, speed adjustments, normalizing characteristics of media items, and the like. For example, the scoring component 404 can employ noise reduction to reduce noise in media items and perform comparison on the media items. In another aspect, the scoring component 404 can determine to utilize a select type of content comparison based on the unstructured metadata. For example, feature evaluation component 302 can determine that the extracted metadata or a portion of the extracted metadata relates to a composition of a video. The scoring component 404 can then select a video comparison technique for the content comparison. It is noted that the scoring component 404 can perform iterations of various content comparison techniques (e.g., audio, video, melody, etc.) which can be selected based on the unstructured metadata.

Figure 5:
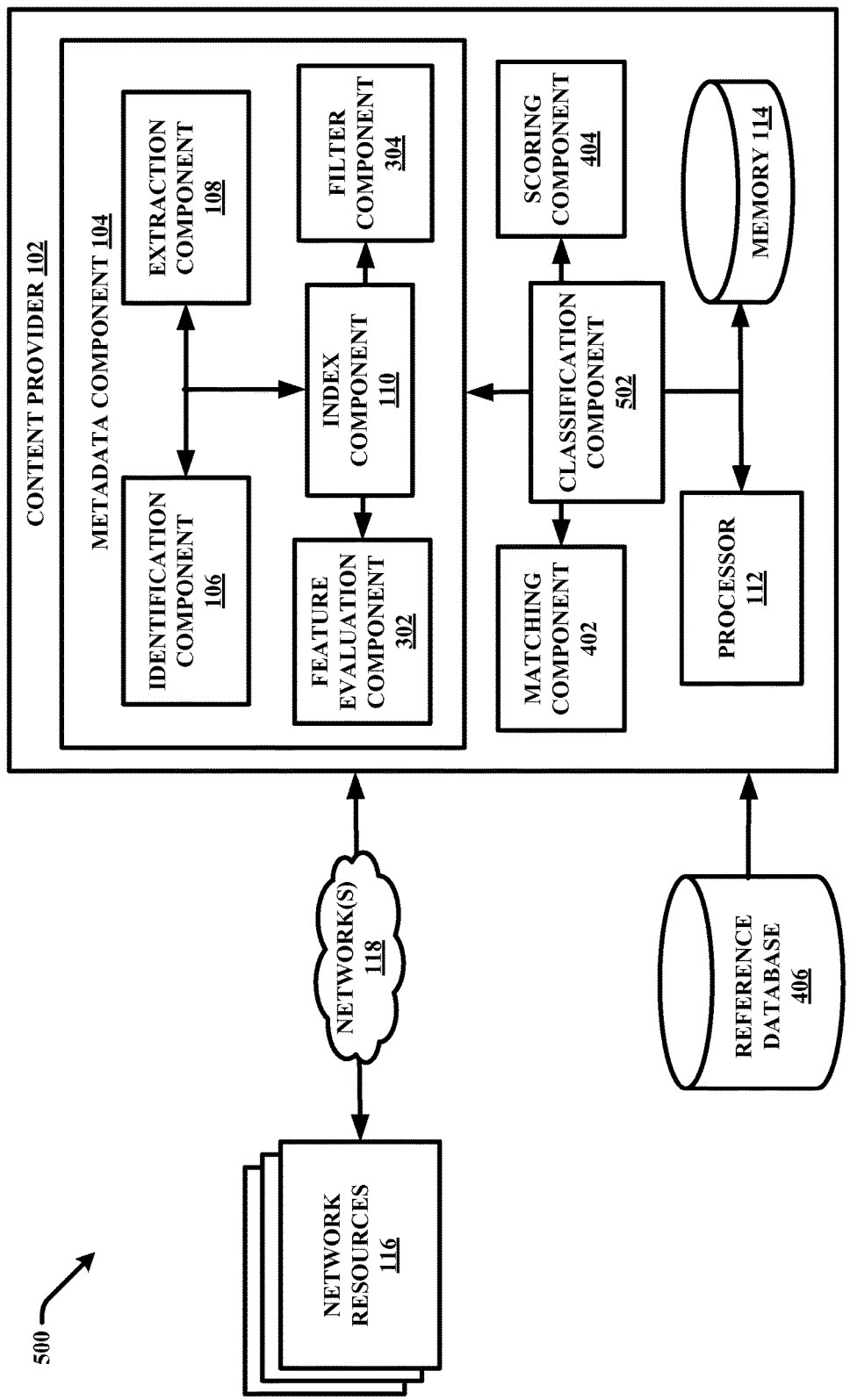
FIG. 5 illustrates a high-level block diagram of an example system configured to extract metadata associated with content items from entities referencing the content items and employ the metadata to classify other similar content items in accordance with certain embodiments of this disclosure.

FIG. 5 illustrates a high-level block diagram of an example system 500 configured to extract metadata associated with content items from network resources referencing the content items and employ the metadata to classify other similar content items in accordance with certain embodiments of this disclosure. System 500 can include same or similar structures, features and functionalities as system 400 with the addition of classification component 502. Repetitive description of like elements employed in respective embodiments of systems described herein is omitted for sake of brevity.

In an aspect, the classification component 502 can classify media items stored in a reference database. In an aspect, the classifications can be stored in a classification database, for example. Media items can be classified by assigning a classification identifier ("ID") to media items. Media items having a common classification ID can be related based on common characteristics, such as author, subject, content, format, and the like. It is noted that the classification component 502 can utilize various artificial intelligence models to classify media items and/or can utilize match confidence scores for classification.

In some implementations, classification of media items can include sorting and/or organizing media items into clusters (e.g., clustering) based on media items have common characteristics. For example, two video items of a same event and/or having identical (or near identical) content can be comprised in a common cluster. In another example, content items can be clustered based on similarities between the metadata respectively associated with the content items.

In various embodiments, the classification component 502 can receive data extracted by the extraction component 108. The data can be unstructured metadata and the classification component 502 can utilize the unstructured metadata to alter existing classifications of content items. In particular, as new metadata is gathered and associated with a content item over time, classification component 502 can routinely evaluate how the content item is classified based on a previous set of metadata associated therewith and the new set of metadata associated therewith. The classification component 502 can further alter the classification of the content item based on the new set of metadata if such an alteration is warranted.

In an aspect, a particular content item may be classified with a relatively low confidence score (e.g., below a threshold level), wherein the confidence score represents a degree to which the metadata (e.g., terms, descriptors, etc.) associated therewith provides a relevant, distinct and useful description of the content item. In an aspect, the classification component 502 can direct metadata component 104 to gather, extract, evaluate and associate new metadata with the content item in response. This new metadata can be combined with the old metadata associated with the content item and evaluated (e.g., via feature evaluation component 302 and filter component 304) to determine a set of the combined metadata to associate with the content item. The classification component 502 can then reclassify the content item based on the new combined metadata associated therewith.

In an aspect, when the content item is a reference content item, this confidence score can be further evaluated by classification component 502 based on a matching history associated with the reference content item. For example, if the content item is regularly associated with false positive and/or false negative results based on metadata matching, classification component can consider the content item a strong candidate for reclassification.

Figure 6:
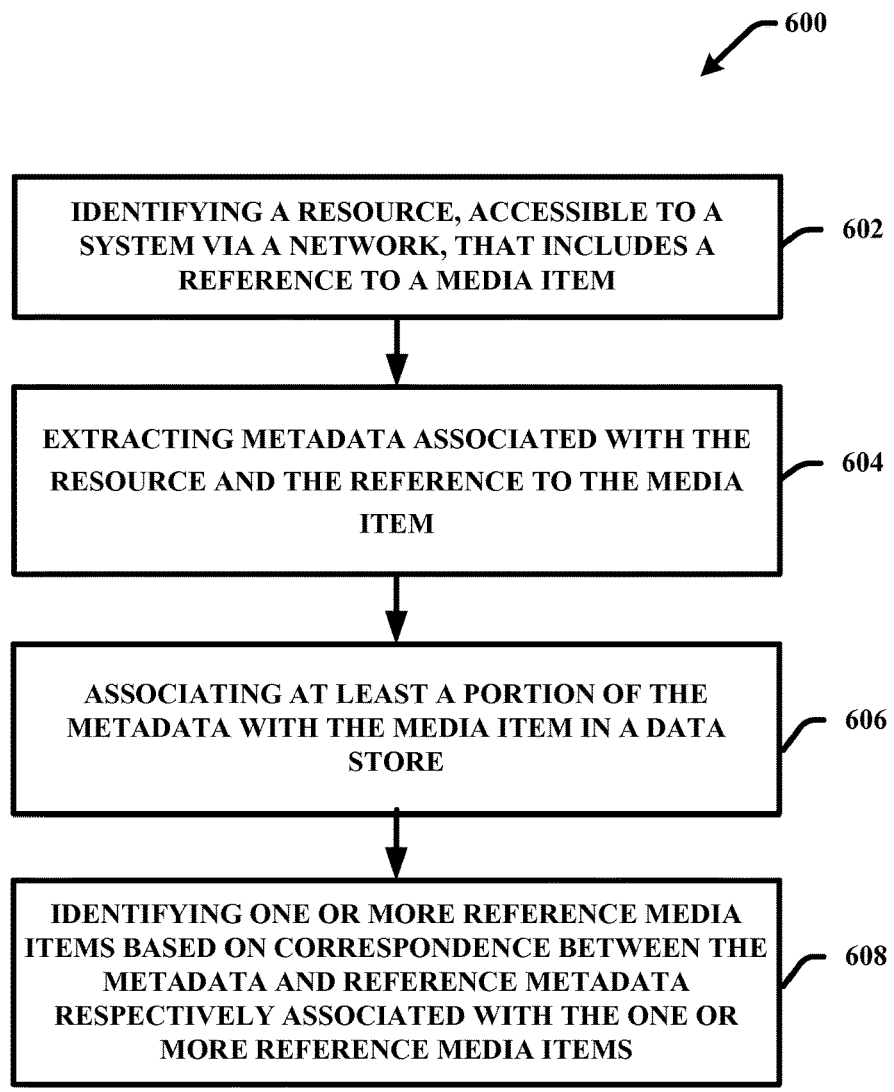
FIG. 6 presents an example method for obtaining metadata for a media item and employing the metadata to facilitate media item identification and matching in accordance with aspects and embodiments described herein.
Figure 7:
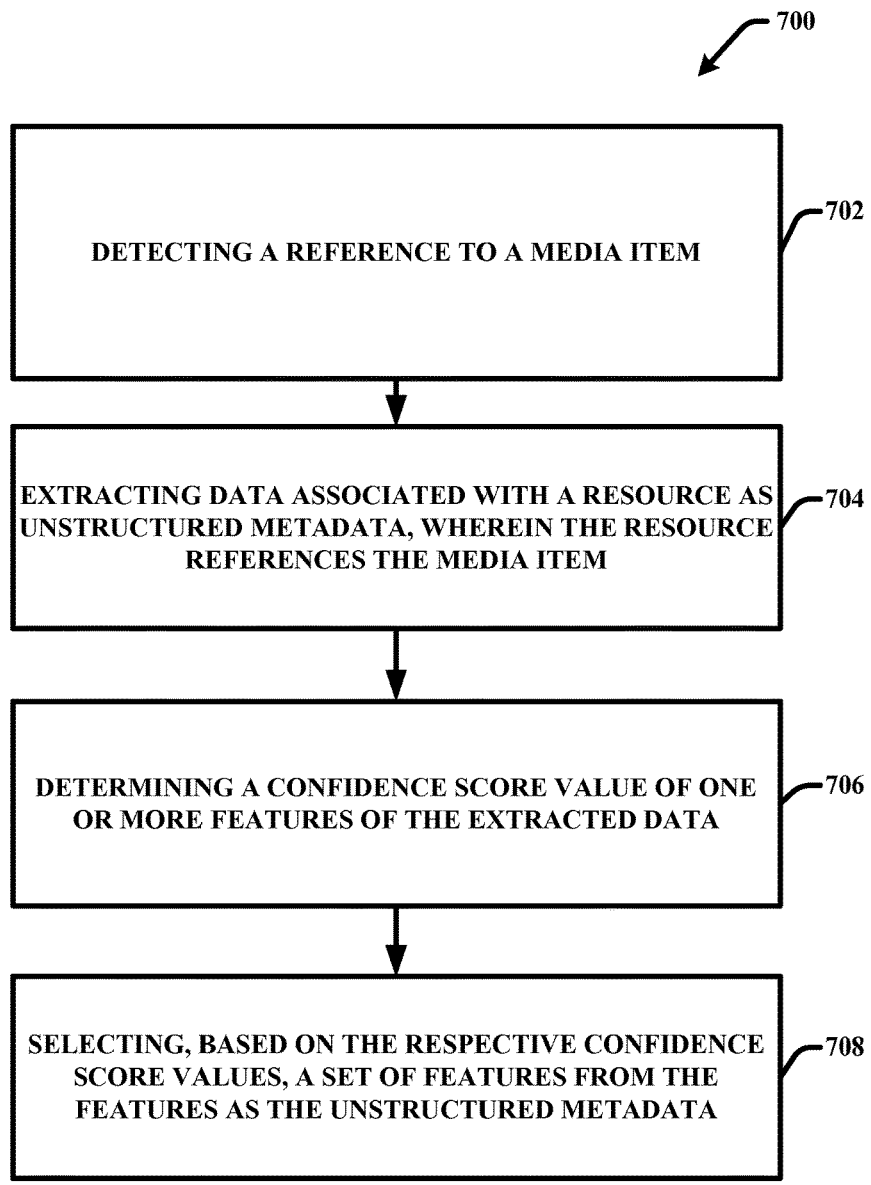
FIG. 7 presents an example method for obtaining metadata for a media item in accordance with aspects and embodiments described herein.
Figure 8:
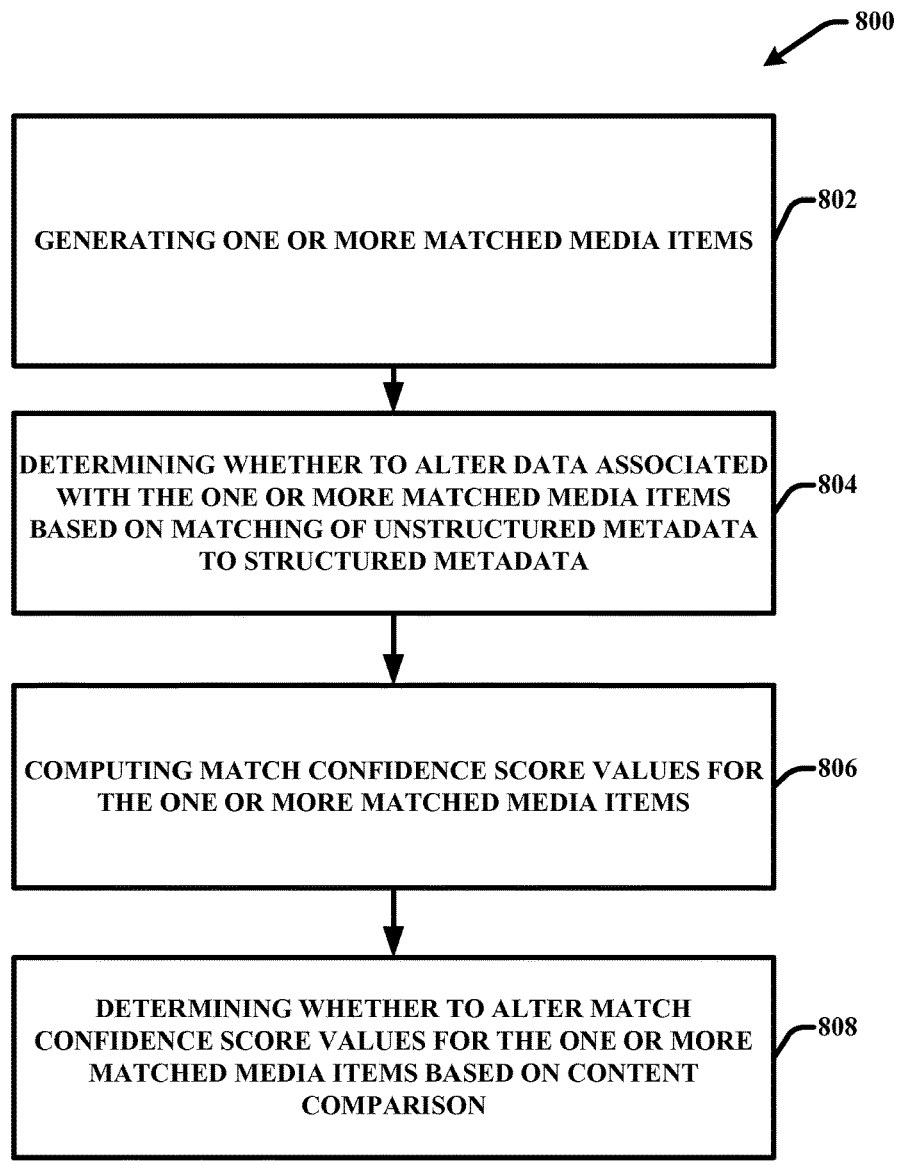
FIG. 8 presents an example method that can provide for altering metadata and altering match confidence score values based on unstructured metadata in accordance with certain embodiments of this disclosure.

FIGS. 6-8 illustrate various methodologies in accordance with certain embodiments of this disclosure. While, for purposes of simplicity of explanation, the methodologies are shown media a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 6-8 can be performed by various systems disclosed herein, such as systems 100, 300, 400 and 500.

FIG. 6 provides an example method 600 for obtaining metadata for a media item and employing the metadata to facilitate media item identification and matching in accordance with aspects and embodiments described herein. Repetitive description of like elements employed in system and methods disclosed herein is omitted for sake of brevity.

At 602, a resource, accessible to a system via a network, that includes a reference to a media item is identified (e.g., via identification component 106). At 604, metadata associated with the resource and the reference to the media item is extracted (e.g., via extraction component 108). In an aspect, extracting the data can include selecting the data, partitioning the data, selecting features of the data, and the like. It is further noted that the system can normalize the data by correction of textual data and the like. The data to be extracted can include content of the resources (e.g., content of a webpage), metadata of the resource, and metadata associated with the reference. The resource can be coded in various formats such as HTML and other formats.

In another aspect, the metadata can represent an image, audio, or other media file having identifiable properties that can be extracted. For example, recognition techniques for audio, video, images, and the like can be utilized to identify a property of a file, such as a symbol in an image file, textual data associated with an audio file, an audio track, and the like. As another example, a webpage can play an audio track and reference a disparate media item. The extraction component 108 can recognize the audio track and generate unstructured metadata based on the audio track, such as a track tile, an author, a release data, and the like. For example, a webpage can be devoted to reviewing a movie. The webpage can play an audio track from a sound track of a movie and can embed a video clip of the movie. Data describing the audio track can be extracted and utilized as unstructured metadata associated with the video clip.

At 606, at least a portion of the metadata is associated with the media item in a data store (e.g., via index component 110). At 608, one or more reference media items are identified based on correspondence between the metadata and reference metadata respectively associated with the one or more reference media items (e.g., via matching component 402). Matching can include a comparison of unstructured metadata to structured metadata to determine a similarity parameter. Based on the matching, the one or more media items and/or data associated with the one or more media items can be altered (e.g., a confidence score).

Turning now to FIG. 7, provided is an example 700 method for obtaining metadata for a media item in accordance with aspects and embodiments described herein. For example, the method 700 can provide for detecting embedded media items, links to media items, and the like, as well as selecting content associated with the resource that embeds and/or links to the media item. Repetitive description of like elements employed in system and methods disclosed herein is omitted for sake of brevity.

At 702, a system can detect (e.g., via identification component 106) a reference to a media item. The reference can include an embed of the media item, a link to a source host of the media item, mirror links to a media item, text describing a media item, and the like. The system can detect the reference through analysis of resources, receiving an indication of a reference (e.g., request to access a media item), manual input, and the like. For example, a system can request resources from a network, such as the World Wide Web, and can analyze the resources for references to media items. It is noted that detection of a reference can include storing data describing a reference (e.g., location, type of reference, data references, data detected, etc.). In an aspect, a list of reference can be kept such that a reference is only analyzed when needed and/or is available if a resource is altered.

At 704, the system can extract (e.g., via extraction component 410) data associated with a resources as unstructured metadata, wherein the resource references the media item. As noted above, the resource can comprise blog entries, news articles, social media websites, emails, bulletins, and/or other resources available on a network. In an aspect, the system can extract the data in response to detection of the reference to the media item. In some implementations, the system can extract the data in response to on occurrence of a triggering event (e.g., a number of detected references to a media item).

At 706, the system can determine (e.g., via feature evaluation component 302) a confidence score value of one or more features of the extracted data. A feature can represent a distinguishable feature of the extracted data and/or of an entity. For example, with reference to FIG. 2, a feature can include a description element 208 that describes other content of the webpage, textual data 210 (and/or portions of textual data 210), embedded media item 218, embedded media item title 214, link to the media item 222, and/or metadata of associated with network resource 206. In implementations, determining the confidence score values can include comparing the features to each other, other entities that reference the media items, structured metadata, and the like. In an aspect, the system can apply a weight to features to determine weighted confidence score values. For example, a weight can be given based on proximity to the reference (e.g., textual data immediately preceding a reference can have a higher relative weight than textual data that does not immediately precede the reference).

At 708, the system can select (e.g., via filter component 304), based on the respective confidence score values, a set of features from the features as the unstructured metadata. For example, the system can select features having confidence score values over a predetermined threshold level, a predetermined number of features having the relatively highest confidence score values, and/or based on other conditions.

It is noted that, while reference numeral 706 describes determining confidence score values of one or more features of the extracted data, as described above, the reference numerals can occur in different orders and/or concurrently. Accordingly, reference numeral 706 can include determining confidence scores values of one or more features to be extracted from a resource. Likewise, a system can select the features to be extracted at 708 and can then extract the selected features at reference numeral 704.

FIG. 8 provides an example 800 method for altering metadata and altering match confidence score values based on unstructured metadata. in accordance with aspects and embodiments described herein. Method 800 can provide for altering metadata and altering match confidence score values based on extracted metadata. For example, the method 800 can provide for generating a set of matched media items and altering data associated with the matched media items based on collection of extracted/unstructured metadata content. Repetitive description of like elements employed in system and methods disclosed herein is omitted for sake of brevity.

At 802, a system can generate (e.g., via matching component 402) one or more matched media items. In an aspect, the one or more matched media items can be associated with a media item referenced by a resource. In another aspect, the one or more matched media items can comprise a media item in a reference database and data representing a reference to the media item. For example, the system can determine whether a media item is referenced by a resource and can match the reference in the resource to a media item stored in a reference database.

At 804, the system can determine (e.g., via classification component 502) whether to alter data associated with the one or more matched media items based on matching of unstructured metadata to structured metadata. For example, the system can determine to alter structured metadata associated with one or more media items based on the unstructured data matching and/or not matching the structured metadata.

At 806, the system can compute (e.g., via scoring component 404) match confidence score values of the one or more matched media items. At 808, the system can determine (e.g., via scoring component 404) whether to alter the match confidence score values for the one or more media items based on content comparison. In an aspect, the system can determine that a confidence score value is below a threshold and further comparison of content is needed. In response to determining to alter the match confidence scores, the system can match fingerprint data, sub fingerprints, content along a certain channel (e.g., audio, video, etc.), and the like. In another aspect, the system can transform media items through cropping, noise reduction, phase shifting, and/or other aspects, such that the media items can be appropriately compared.

As described supra with reference to the drawing, the subject disclosure is directed to systems and methods for gathering metadata associated with a content item and employing the metadata to facilitate content identification and matching. These actions do not describe an abstract concept, such as a fundamental economic practice, a method of organizing human activity, an idea itself (standing alone), or a mathematical relationship. In contrast, the subject systems and processes are directed to identifying hyperlinks and embedded representations of content items at Internet based platforms (e.g., websites, webpages, emails, application, etc.). The mechanisms via which the references are identified include using web crawling and/or incoming access requests to access or play the content items as a result of selection of the hyperlink and/or interaction with the embedded representation of the content item at the respective Internet based platforms. Further, after a reference to a content item is identified, the subject systems and methods are directed to extracting metadata associated with the content item from the external Internet based platforms. As can be appreciated by those skilled in the art as well as those unskilled in the art, the above described concepts are inextricably rooted in Internet based computer technology in order to overcome a problem (e.g., obtaining and enhancing metadata and performing automated content identification for large scale media sharing systems) specifically arising in the realm of computer networks.

The systems and processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
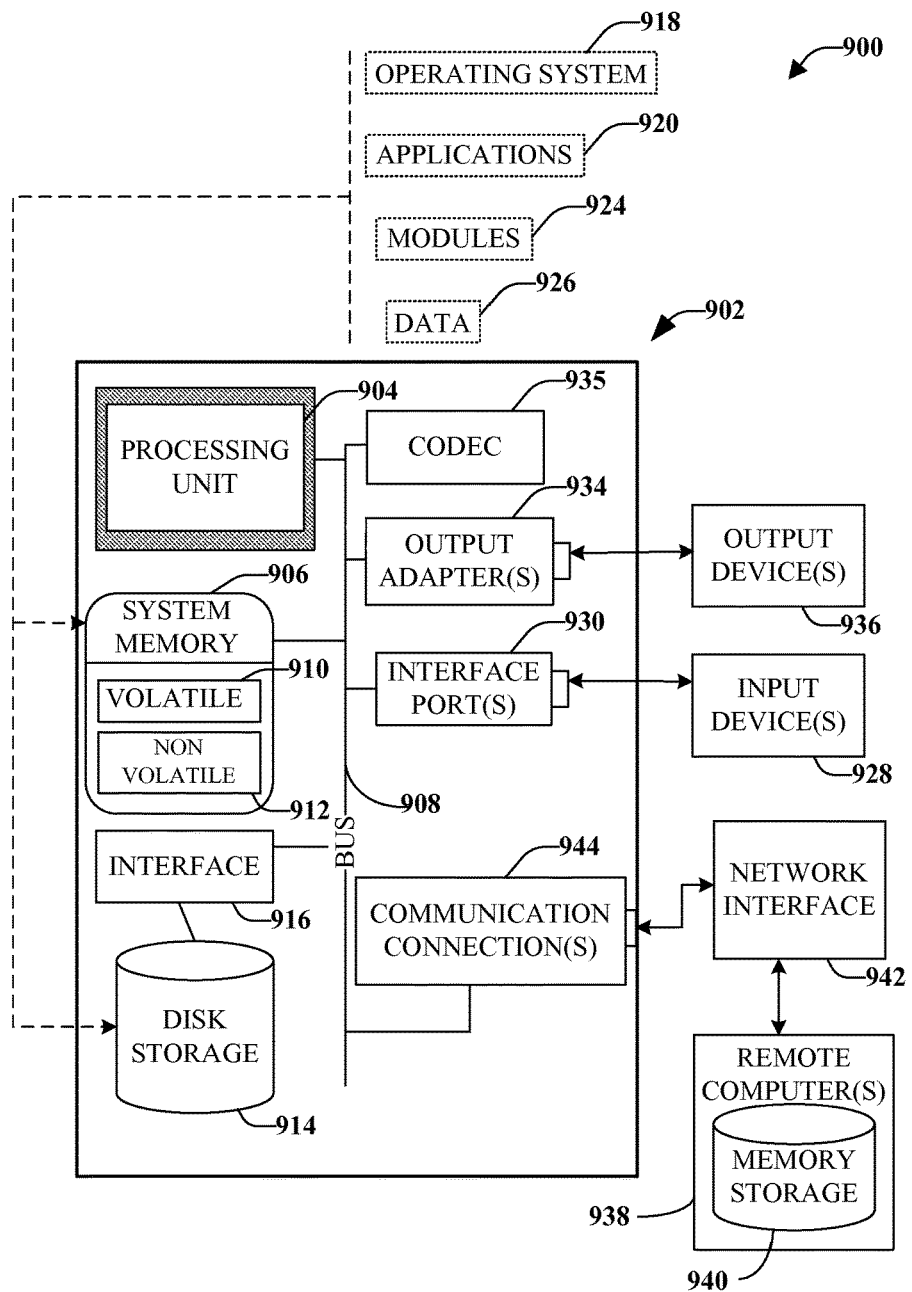
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. For example, in one or more embodiments, all, or portions of codec 935 can be included in encoding component 918 and/or decoding component 914. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to control use of such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
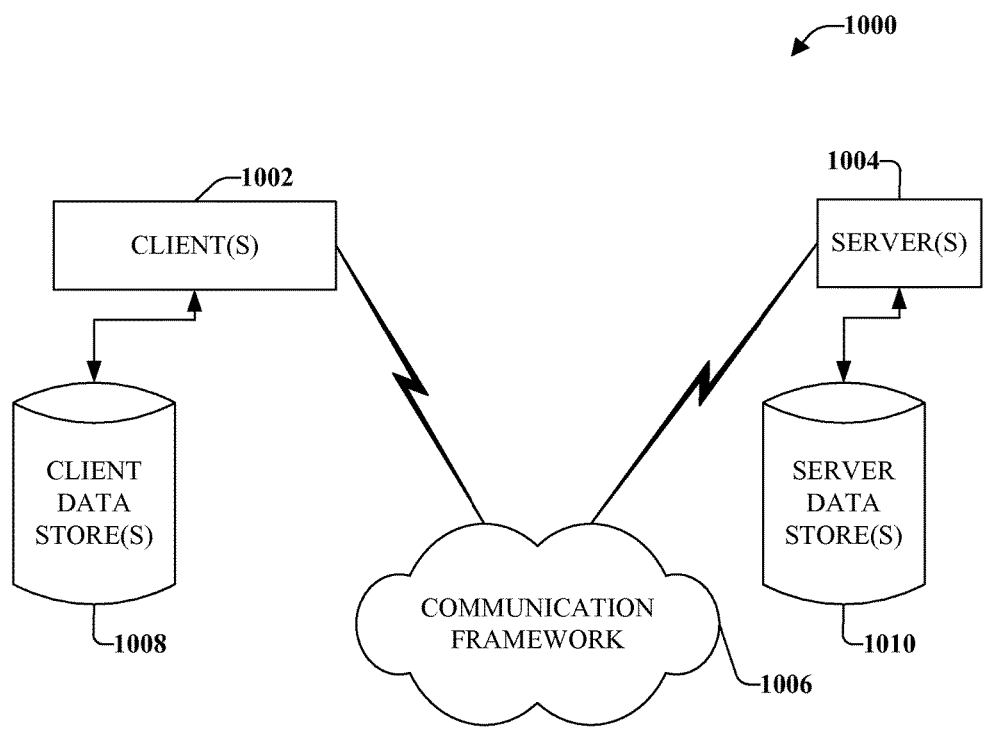
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data, resources referencing media items, and the like. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
   a computer-readable storage media having stored thereon computer executable components, and
   a processor that, when executing computer executable components stored in the computer-readable storage media, is configured to:
      receive, at a content provider system, an uploaded media content item;
      identify a plurality of network resources, wherein each of the plurality of network resources includes a reference to the uploaded media content item;
      extract, from each of the plurality of network resources, descriptive metadata associated with content from the network resource and associated with the reference to the uploaded media content item;
      select a portion of the descriptive metadata based on frequency within the plurality of network resources;
      associate the portion of the descriptive metadata with the uploaded media content item in a data store;
      identify one or more reference content items from a plurality of reference content items that have been uploaded to the content provider system based on correspondence between the portion of the descriptive metadata associated with the uploaded media content item and reference metadata respectively associated with the one or more reference content items; and
      determine whether content from the uploaded media content item matches content from the one or more reference content items.

2. The system of claim 1, wherein the reference to the uploaded media content item includes at least one of: a link to the uploaded media content item and an embedded representation of the uploaded media content item.

3. The system of claim 2, wherein the uploaded media content item is a video file or audio file and the uploaded media content item is located at a server device included with the system and wherein the processor is further configured to identify the network resource based on reception, by the system, of a request to play the uploaded media content item, wherein the request is responsive to at least one of: selection of the link to the uploaded media content item at the resource or initiation of playing of the uploaded media content item at the network resource.

4. The system of claim 2, wherein the processor is further configured to extract the descriptive metadata from at least one of: a uniform resource identifier (URI) for the network resource, a uniform resource locator (URL) for the network resource, a title of the network resource, media content at the network resource, and text content at the network resource.

5. The system of claim 2, wherein the processor is further configured to extract the descriptive metadata from characters included in, or associated with, the link to the uploaded media content item or the embedded representation of the uploaded media content item.

6. The system of claim 2, wherein the processor is further configured to extract the descriptive metadata from text at the network resource included within a defined region relative to the link to the uploaded media content item or the embedded representation of the uploaded media content item.

7. The system of claim 2, wherein the link to the uploaded media content item or the embedded representation of the uploaded media content item is included as a feed item within a feed at the network resource, and wherein the processor is further configured to extract the descriptive metadata from text included with the feed item.

8. The system of claim 1, wherein the processor is further configured to alter the reference metadata associated with the one or more reference content items based on the descriptive metadata.

9. The system of claim 1, wherein the processor is further configured to determine respective confidence score values of one or more features of the descriptive metadata based on respective relationships between the one or more features and the reference to the uploaded media content item.

10. The system of claim 9, wherein the processor is further configured to identify, a subset of the one or more features based on the respective confidence score values associated therewith, and associate only the subset of the one or more features with the uploaded media content item in the data store.

11. The system of claim 1, wherein the processor is further configured to determine match confidence score values for the one or more reference content items based on degrees of the correspondence between the descriptive metadata and the reference metadata respectively associated with the one or more reference content items.

12. A method, comprising
using a processor to execute the following computer executable instructions stored in a memory to perform the following acts:
receiving, at a content provider system, an uploaded media content item;
identifying a plurality of network resources, wherein each of the plurality of network resources includes a reference to the uploaded media content item;
extracting, from each of the plurality of network resources, descriptive metadata associated with content from the network resource and associated with the reference to the uploaded media content item;
selecting a portion of the descriptive metadata based on frequency within the plurality of network resources;
associating the portion of the descriptive metadata with the uploaded media content item in a data store;
identifying one or more reference content items from a plurality of reference content items that have been uploaded to the content provider system based on correspondence between the portion of the descriptive metadata associated with the uploaded media content item and reference metadata respectively associated with the one or more reference content items; and
determining whether content from the uploaded media content item matches content from the one or more reference content items.

13. The method of claim 12, wherein the reference to the uploaded media content item includes at least one of: a link to the uploaded media content item or an embedded representation of the uploaded media content item.

14. The method of claim 13, wherein the uploaded media content item is located at a server device included with the system, the method further comprising:
identifying the network resource based on reception, by the system, of a request to play the uploaded media content item, wherein the request is responsive to at least one of: selection of the link to the uploaded media content item at the network resource or initiation of playing of the uploaded media content item at the network resource.

15. The method of claim 13, wherein the extracting comprises extracting the descriptive metadata from at least one of: a uniform resource identifier (URI) for the network resource, a uniform resource locator (URL) for the network resource, a title of the network resource, media content at the network resource, or text content at the network resource.

16. The method of claim 13, wherein the extracting comprises extracting the descriptive metadata from characters included in, or associated with, the link to the media item or the embedded representation of the uploaded media content item.

17. A computer readable storage device comprising instructions that, in response to execution, cause a system comprising a processor to perform operations, comprising:
receiving, at a content provider system, an uploaded media content item;
identifying a plurality of network resources, wherein each of the plurality of network resources includes a reference to the uploaded media content item;
extracting, from each of the plurality of network resources, descriptive data associated with the reference content from the network resource and associated with the reference to the uploaded media content item from the resource; and
selecting a portion of the descriptive metadata based on frequency within the plurality of network resources;
associating the portion of the descriptive metadata with the uploaded media content item in a data store;
identifying one or more reference content items from a plurality of reference content items that have been uploaded to the content provider system based on correspondence between the portion of the descriptive metadata associated with the uploaded media content item and reference metadata respectively associated with the one or more reference content items; and
determining whether content from the uploaded media content item matches content from the one or more reference content items.

18. The computer readable storage device of claim 17, wherein the operations further comprises:
altering a classification of the one or more reference content items based on the descriptive data.

19. The computer readable storage device of claim 17 wherein the operations further comprise:
matching the uploaded media content item based on a comparison of respective content of the one or more reference content items.

20. The computer readable storage device of claim 17, wherein determining that the resources comprises the reference further comprises:
requesting the network resource from a network device; and
analyzing the network resource to determine whether the network resource comprise at least one of: an embed of the uploaded media content item, a link that directs to a location of the uploaded media content item, and a description of the uploaded media content item.

* * * * *